Patented Nov. 18, 1952

2,618,647

UNITED STATES PATENT OFFICE 2,618,647

PROCESS FOR THE PRODUCTION OF ORGANOSILICON COMPOUNDS

David B. Hatcher, Toledo, Ohio, assignor to Libbey-Owens-Ford Glass Company, Toledo, Ohio, a corporation of Ohio No Drawing. Application January 7, 1950,
Serial No. 137,495

10 Claims. (Cl. 260—448.2)

The invention relates to a process for the production of organosilicon compounds, and more particularly to a process for the production of aralkylsilanes.

The principal object of the invention is to provide a novel process by which improved yields may be obtained in the production of organosilicon compounds from starting materials consisting of haloalkylsilanes and aromatic compounds. More specific objects and advantages are apparent from the following description, which illustrates and discloses but is not intended to limit the scope of the invention.

After a haloalkylsilane and an aromatic compound have been reacted in the presence of an aluminum halide catalyst, the catalyst ordinarily is removed before separation of the reaction mixture by distillation. During the distillation, any unreacted portion of the haloalkylsilane or of the aromatic compound distills over before the aralkylsilane product. The distillation leaves a residue that represents a loss of a considerable portion of the reacted material.

It has now been found that this residue contains poly(silylalkyl) aromatic compounds formed by the reaction of one molecule of the original aromatic compound with more than one molecule of the haloalkylsilane starting material. An aluminum halide is known to cause rupture and rearrangement of the side chains in an aromatic hydrocarbon. Thus it might be expected that the action of an aluminum halide upon such a poly(silylalkyl) aromatic compound would be to rupture the alkyl radicals instead of producing any useful product. The present invention is based upon the discovery that an aluminum halide does not rupture the alkyl radicals in such a poly(silylalkyl) aromatic compound and that a substantial additional yield of the desired aralkylsilane can be obtained by reacting an additional amount of the original aromatic compound in the presence of an aluminum halide with the distillation residue from the original reaction of the aromatic compound with a haloalkylsilane.

The present invention consists in a method that includes reacting, in the presence of an aluminum halide in which each halogen atom has an atomic weight between 35 and 80, (A) a substance in which there is an aromatic radical having hydrogen atoms attached to at least two adjacent nuclear carbon atoms, in which any atom other than carbon and hydrogen consists of a nuclear halogen having an atomic weight less than 80, and in which not more than one carbon atom is contained in any one monovalent radical attached to an aromatic nucleus, and (B) the distillation residue remaining after the reaction, in the presence of such an aluminum halide, of (a) the aforementioned substance and (b) a substance whose molecule consists of a silicon atom to which are attached four monovalent radicals not more than two of which are unsubstituted saturated hydrocarbon radicals, from one to three of which are halogens having an atomic weight less than 80 and from one to two of which are halo-substituted saturated hydrocarbon radicals in which the substituents consist of halogens having an atomic weight between 35 and 80.

In the method of the invention the aluminum halide in which each halogen atom has an atomic weight between 35 and 80 is aluminum chloride or aluminum bromide. The terms "aluminum chloride" and "aluminum bromide" are used herein to mean anhydrous aluminum chloride and anhydrous aluminum bromide. The preferred aluminum halide for use in the process of the invention is aluminum chloride.

In the practice of the invention, the substance (A) in which there is an aromatic radical having hydrogen atoms attached to at least two adjacent nuclear carbon atoms, in which any atom other than carbon and hydrogen consists of a nuclear halogen having an atomic weight less than 80, and in which not more than one carbon atom is contained in any one monovalent radical attached to an aromatic nucleus may be any substance whose molecule contains from one to three benzene nuclei having from 6 to 18 carbon atoms and having hydrogen atoms attached to at least two adjacent nuclear carbon atoms, has not more than four side chains each of which contains not more than one carbon atom, and has no substituents or has from one to four nuclear substituents each of which is a halogen of atomic weight less than 80 (chloro, bromo or fluoro). A molecule of such a substance may be an unsubstituted or nuclearly halo-substituted hydrocarbon of the benzene series or of the naphthalene series or of the anthracene series having not more than four side chains each of which is methyl. When the organosilicon compound produced by the method of the invention is a bis or tris(silylalkyl) aromatic compound, it is desirable that there be not more than three halo substituents and not more than three methyl radicals in the molecule of the reacting aromatic substance.

Examples of aromatic compounds that may be used in the practice of the invention include: benzene, toluene, xylenes, diphenyl, terphenyls, naphthalene, 1-methyl naphthalene, 2-methyl naphthalene, anthracene, 9-methyl anthracene, 2,3-dimethyl anthracene, 2,4-dimethyl anthracene, bromobenzene, o-bromotoluene, m-bromotoluene, p-bromotoluene, o-chlorotoluene, m-chlorotoluene, p-chlorotoluene, 2-chloro-m-fluorotoluene, 2,6-dichlorotoluene, 4-bromo-o-xylene, 4-bromo-m-xylene, 2-bromo-p-xylene, 3-bromo-o-xylene, chlorobenzene, 1-chloro-4-fluorobenzene, alpha-bromonaphthalene, beta-bromonaphthalene, 2-chloronaphthalene, 1-bromo-3-chloronaphthalene, 2-chloro-1-methyl naphthalene, 1-bromo-8-methyl naphthalene, 1-bromo-7-methyl naphthalene, 7-chloro-1-methyl naphthalene, 1-bromo-2-methyl naphthalene, 4-bromo-2-methyl naphthalene, 8-bromo-2-methyl naphthalene, 1-bromo-5-methyl naphthalene, 1-bromo-2,7-dimethyl naphthalene, 4-bromo-1,6-dimethyl naphthalene, 1-bromo-2,6-dimethyl naphthalene, 4-bromo-1,2-dimethyl naphthalene, 1-bromo-2,3-dimethyl napthalene, 1-bromo-4-methyl naphthalene, 7-bromo-1-methyl naphthalene, 9,10-dibromoanthracene, 9,10-dichloroanthracene, phenanthrene, 3-methyl phenanthrene, 1,4-dimethylphenanthrene, and o-, m- and p-dichlorobenzenes.

A halo radical attached to a silicon atom in a substance (b) may be any halogen having an atomic weight less than 80.

"Saturated hydrocarbon radical" as used herein with reference to a substance (b) means a straight, branched, or closed chain hydrocarbon radical having saturated

bonds. A straight or branched chain monovalent saturated hydrocarbon radical attached to the silicon atom in a substance (b) may be a primary or secondary alkyl radical having from one to twelve carbon atoms (i. e., methyl, ethyl, propyl, isopropyl, n-butyl, isobutyl, secondary butyl, or any primary or secondary alkyl radical having from 5 to 12 carbon atoms). A closed chain monovalent saturated hydrocarbon radical attached to the silicon atom in a substance (b) may be a cycloalkyl radical having 5 or 6 carbon atoms (i. e., cyclopentyl or cyclohexyl), or a mono-, di- or tri-alkyl-substituted cyclopentyl or cyclohexyl radical, each alkyl substituent being a primary, secondary or tertiary alkyl radical having from one to six carbon atoms, the total number of carbon atoms in the alkyl substituents being not more than six (i. e., the substitugents being: one, two, or three methyls or ethyls; one ethyl and one methyl; two methyls and one ethyl; two ethyls and one methyl; either propyl radical, two propyl radicals; either propyl radical and one or two methyls; either propyl radical and ethyl; either propyl radical, one ethyl, and one methyl; any butyl radical; any butyl radical and methyl or ethyl; any butyl radical and two methyls; any pentyl radical; any pentyl radical and methyl; or any hexyl radical).

"Halo-substituted saturated hydrocarbon radical" or "haloalkyl radical," as used herein, means a radical consisting of any monovalent saturated hydrocarbon radical described above, in which from one to two of the hydrogen atoms have been replaced by halogen atoms having an atomic weight between 35 and 80. There should be no more than two such halogen atoms per molecule of the silicon-containing substance (referred to herein as "haloalkylsilane") used in the process of the present invention (i. e., there may be one or two mono-substituted haloalkyl radicals or one di-substituted haloalkyl radical attached to a silicon atom).

In the practice of the present invention it is preferred that the distillation residue employed be that remaining after the reaction in the presence of an aluminum halide of an aromatic compound (as hereinbefore defined) and a haloalkylsilane whose molecule consists of a silicon atom to which are attached four monovalent radicals not more than one, i. e., none or only one, of which is an unsubstituted saturated hydrocarbon radical, from two to three of which are halo, and only one of which is a halo-substituted saturated hydrocarbon radical (e. g., a mono- or di-chloro- or bromo-substituted methyl, ethyl, propyl, isopropyl, n-butyl, isobutyl or secondary butyl radical; a mono- or di-chloro- or bromo-substituted primary or secondary alkyl radical having a straight or branched chain consisting of from 5 to 12 carbon atoms; or a mono- or di-chloro- or bromo-substituted cyclohexyl or cyclopentyl radical having not more than 12 carbon atoms, and having not more than three primary, secondary or tertiary alkyl substituents containing a total of not more than 6 carbon atoms). It is desirable that this latter substance be one having the general formula

wherein w is a mono-halo-substituted monovalent saturated hydrocarbon radical in which the substituent is a halogen having an atomic weight between 35 and 80. The preferred substituent in the mono-halo-substituted saturated hydrocarbon radical is chloro.

Examples of haloalkylsilanes, from the reaction of which with an aromatic compound in the presence of an aluminum halide is obtained a distillation residue that can be employed in the process of the invention, include: alpha-chloroethyltrichlorosilane, beta-chloroethyltrichlorosilane, alpha-chloropropyltrichlorosilane, beta-chloropropyltrichlorosilane, gamma-chloropropyltrichlorosilane, chlorocyclohexyltrichlorosilane, alpha-chloroethylethyldichlorosilane, 1-1 dichloroethyltrichlorosilane, 1-2 dichloroethyltrichlorosilane, beta-chlorobutyltrichlorosilane, gamma-chlorobutyltrichlorosilane, delta-chlorobutyltrichlorosilane, alpha-chlorobutyltrichlorosilane, beta-chloroisobutyltrichlorosilane, and beta-chloroethylethyldichlorosilane.

These haloalkylsilanes and others that may be used in the practice of the present invention may be prepared by reaction between sulfuryl chloride or bromide and a silane having the general formula

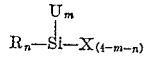

wherein m is a number from 0 to 2; n is an integer from 1 to 2; (m+n) is from 1 to 3; X is a halo radical having an atomic weight less than 80; R is an unsubstituted saturated hydrocarbon chain, the chain being straight, branched or closed, having not more than 12 carbon atoms; and U is an unsubstituted saturated hydrocarbon chain having not more than 12 carbon atoms. Such a reaction results in mono-chlorination or mono-bromination of a hydrocarbon chain. Further halo substitution is achieved by reacting the mono-chlorinated or -brominated silane with sulfuryl chloride or sulfuryl bromide. This second chlorination or bromination produces silanes wherein the second bromo or chloro radical is attached to the hydrocarbon chain to which is attached the first chloro or bromo radical as well as silanes wherein the second bromo or chloro radical is attached to a different chain. By suitable repetition of this reaction any desired silane reactant may be prepared. The products of each chlorination or bromination are separated by fractional distillation. In order to demonstrate the procedure by which such a chlorination or bromination is conducted the following method is described:

Sulfuryl chloride (432 grams) and n-propyltrichlorosilane (534 grams) are mixed and added to a one liter flask which is fitted with a reflux condenser equipped with a calcium chloride drying tube. Benzoyl peroxide (2 grams) is added to the flask which is then heated on a steam bath and maintained in gentle reflux for about 16 hours. During this refluxing sulfur dioxide and hydrogen chloride are evolved. The liquid remaining in the flask after the refluxing is cooled, and is separated into its component parts by fractional distillation through a glass column (about 18 mm. in diameter and 18 inches long) packed with glass helices. This fractionation yields 183 grams of beta-chloropropyltrichlorosilane and 98 grams of gamma-chloropropyltrichlorosilane in addition to a small amount of alpha-chloropropyltrichlorosilane.

As hereinbefore described analogous results are achieved by the use of sulfuryl bromide, and a second chloro or bromo radical can be substituted for hydrogen by repeating the reaction between sulfuryl chloride or sulfuryl bromide and one of the products of the first chlorination or bromination (e. g., alpha-chloropropyltrichlorosilane, beta-chloropropyltrichlorosilane or gamma-chloropropyltrichlorosilane). Thus, by suitable chlorination and bromination reactions it is possible to prepare any of the silane reactants hereinbefore described.

Examples of the silanes that may be chlorinated or brominated to produce substances that may be used in the practice of the invention include ethyltrifluorosilane, diethyldifluorosilane, triethylfluorosilane, n-propyltrifluorosilane, tri-n-propylfluorosilane, isopropyltrifluorosilane, n-butyltrifluorosilane, di-n-butyldifluorosilane, tri-n-butylfluorosilane, n-pentyltrifluorosilane, di-n-pentyldifluorosilane, tri - n - pentylfluorosilane, ethyldifluorochlorosilane, ethylfluorodichlorosilane, n-propyldifluorochlorosilane, n-propylfluorodichlorosilane, isopropyldifluorochlorosilane, isopropylfluorodichlorosilane, n-butyldifluorochlorosilane, n-butylfluorodichlorosilane, ethyltrichlorosilane, diethyldichlorosilane, triethylchlorosilane, ethyl-n-propyldichlorosilane, ethylisobutyldichlorosilane, n-propyltrichlorosilane, di-n-propyldichlorosilane, isopropyltrichlorosilane, n-butyltrichlorosilane, isobutyltrichlorosilane, n-pentyltrichlorosilane, isopentyltrichlorosilane, n-hexyltrichlorosilane, hexyltrichlorosilanes, dihexyldichlorosilanes, n-octyltrichlorosilane, n-decyltrichlorosilane, n-dodecyltrichlorosilane, triethylbromosilane, tri-n-propylbromosilane, triisobutylbromosilane, cyclohexyltrichlorosilane and tri-isopentylbromosilane.

Other silanes that may be chlorinated or brominated by the procedure hereinbefore described to produce a haloalkylsilane which may be used in the practice of the present invention may be prepared by one of the following methods:

(1) A Grignard reaction between a silicon tetrahalide or an organotrihalosilane and a halo-substituted hydrocarbon in the presence of magnesium. The halo-substituted hydrocarbon and the magnesium are believed to react to produce an organo magnesium halide which then reacts with the silicon tetrahalide or organotrihalosilane. Such reactions proceed at a faster rate at elevated temperatures and are usually exothermic in nature. It is ordinarily desirable, therefore, to conduct the reaction in a vessel equipped with a heating coil and cooling means (e. g., a reflux condenser) so that the reactants can be heated to such a temperature that the reaction proceeds at a substantial rate, and then the maximum output of heat generated by the reaction can be removed through the cooling means. It is usually desirable to conduct the reaction in the presence of diethyl ether as a solvent; the ether has the double effect of initiating the Grignard reaction and of facilitating control of the temperature in the reaction vessel. Examples of halo-substituted hydrocarbons that can be reacted with a silicon tetrahalide or an organotrihalosilane, in the presence of magnesium, include primary and secondary alkyl halides such as methyl bromide or chloride, ethyl bromide or chloride, n-propyl bromide or chloride, isopropyl bromide or chloride, n-butyl bromide or chloride, secondary butyl bromide or chloride, isobutyl bromide or chloride, n-amyl bromide, isoamyl bromide, secondary amyl bromide, n-hexyl bromide, n-heptyl bromide, 3-bromoheptane, 4-bromoheptane, n-octyl bromide, 2-bromooctane, 2-iodononane, 1-bromo-3-methylnonane, 4-chloro-4-methylnonane, 5-chloro-5-methylnonane, 2-bromodecane, 1-bromo - 6 - methyldecane, 2-chloro-2-methyldecane, 5-chloro-5-ethyldecane, 1-bromododecane and 4-bromododecane.

(2) A reaction between an alkene having from 2 to 12 carbon atoms and a silicohaloform. Silanes that are produced by means of such reaction have alkyl radicals derived from alkenes by the addition of a hydrogen to one of the carbon atoms linked by the double bond in the alkene molecule, the free valence being attached to the other of the carbon atoms linked by the double bond in the alkene. Alkenes that can be used in such a reaction include: ethylene, propene, any butene, pentene, hexene, heptene, octene, nonene, decene, undecene, and dodecene.

By the process of the invention increased yields of organosilicon compounds may be obtained. The distillation residue employed in the process of the invention is the mixture remaining after distilling the product of the reaction in the presence of an aluminum halide of an aromatic compound and a haloalkylsilane (as hereinbefore defined). In the reaction by which the residue is formed, the ratio of reactants may be such as to produce predominantly a mono(silylalkyl)aromatic compound (i. e., an aralkylsilane). A halogen atom is then split out of a haloalkyl radical in the molecule of the haloalkylsilane, and a hydrogen atom is split out of an aromatic nucleus in the molecule of the aromatic compound, so that the two reacting molecules are linked into a single molecule by a

bond. On the other hand, the ratio of reactants may be adjusted to produce predominantly a bis or tris(silylalkyl)aromatic compound. In either case, the distillation residue has been found to contain higher boiling poly(silylalkyl) aromatic compounds. By the process of the invention such a distillation residue is reacted in the presence of an aluminum halide with an additional amount of the aromatic compound to obtain an increased yield of the desired reaction product. It is always necessary to add more of the aromatic compound to the distillation residue, since any unreacted portion of the original aromatic reactant distills over before the reaction product can be distilled from the residue. When the aluminum halide is not removed from the original reaction mixture before distillation, it may not be necessary to use additional aluminum halide in reacting the distillation residue with an aromatic compound by the process of the invention. However, since some of the aluminum halide remaining in the residue may be inactive, for example, in the form of a complex, it is usually most desirable to add more of the aluminum halide.

The method of the invention may be carried out by reacting the distillation residue obtained from a batch process or a continuous process for preparing organosilicon compounds (as hereinafter described) with additional amounts of the aluminum halide and aromatic compound. If desired, the process of the invention may be carried out continuously by leaving the distillation residue in the reaction vessel, distilling a mixture of reaction products and unreacted aromatic compound continuously from the reaction vessel, recycling the aromatic compound and undesired reaction products to the reaction vessel, and feeding additional aromatic compound and haloalkylsilane to the reaction vessels at such a rate as to maintain the desired concentration of reactants. The process may also be carried out by adding the distillation residue obtained from a batch process for preparing an organosilicon compound to the reaction mixture for preparing a subsequent batch of the organosilicon compound. The yield of the organosilicon compound obtained by reacting in the presence of an aluminum halide a haloalkylsilane, an aromatic compound, and the distillation residue from a similar reaction gives a yield of the organosilicon compound that is substantially greater than the yield obtained when the distillation residue is omitted.

The following discussion of the procedure for reacting an aromatic compound and a haloalkylsilane in the presence of an aluminum halide to obtain the distillation residue used in the present process applies also to the present process for reacting the distillation residue from such a reaction with an aromatic compound in the presence of an aluminum halide, or with a haloalkylsilane and an aromatic compound in the presence of an aluminum halide. That is, in such procedure the haloalkylsilane may be replaced with an equivalent amount of the distillation residue from a similar reaction or of a mixture of the distillation residue and the haloalkylsilane.

The procedure for adding the aluminum halide to the mixture of haloalkylsilane and aromatic compound is dependent upon the vigor with which these substances react, as evidenced by the evolution of HCl. The total charge of the aluminum halide may be added to the mixture at room temperature in small portions over a period of from 20 to 45 minutes, and then the mixture may be refluxed for 15 or 20 minutes to complete the reaction and to drive off HCl. Usually, the first portion of the aluminum halide (¼ to ⅓ of the total amount to be added) is added very carefully at room temperature to the reaction mixture, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions.

When the concentration of the aluminum halide is maintained at the minimum amount necessary for reaction, it is possible to isolate the pure product by double distillation. Distillation of the reaction mixture in the presence of the aluminum halide, however, always involves the danger of decomposition or rearrangement of the desired product as well as contamination of the distillate with the aluminum halide. It is usually desirable, therefore, to remove the catalyst before distillation, and use of a large excess of the aluminum halide should be avoided. The aluminum halide should not be added in excess of about 5 mole per cent (based on the amount of haloalkylsilane present in the reaction mixture). It is preferable to use not more than about 3 mole per cent and most desirable that the amount of the aluminum halide used be not more than about 2 mole per cent based on the amount of haloalkylsilane. An amount of the aluminum halide less than about .3 mole per cent ordinarily is ineffective although smaller amounts can be used in some cases at slightly elevated temperatures, and it is preferable to use at least about .5 mole per cent and most desirable that the amount of the aluminum halide used be not less than about .75 mole per cent.

For example, aluminum chloride may be removed from the reaction mixture before distillation by a procedure which involves the addition of phosphorus oxychloride to the reaction mixture. The phosphorus oxychloride binds the aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (107° C.). After further cooling an amount of a hydrocarbon solvent equal to the volume of the reaction mixture is added to precipitate the $AlCl_3.POCl_3$ complex. Such hydrocarbon solvents include pentane, ligroin and petroleum ethers. The mixture is allowed to stand overnight, and the solid complex is filtered from the solution or the liquid to be distilled is decanted from the mixture, leaving a residue containing the $AlCl_3.POCl_3$ complex. An absorbing agent such as kieselguhr may be added in place of or in addition to the hydrocarbon solvent to absorb the $AlCl_3.POCl_3$ complex, and after the reaction mixture cools to room temperature the liquid to be distilled may be filtered from the absorbed complex. There is less chance that aluminum chloride will distill with the product when it is in the form of a complex than when it is in the free state, and when this complex is relatively non-volatile as compared to the organosilane product the product may be distilled under reduced pressure in the presence of the $AlCl_3.POCl_3$ complex.

The method may be conducted as a continuous process either by (1) employing a contacting tower and passing the mixture of aromatic compound and haloalkylsilane over the aluminum halide or over an inactive material such as porous porcelain impregnated with the aluminum halide or by (2) suspending the finely-divided aluminum halide in the mixture of aromatic compound and haloalkylsilane and allowing the material to remain in a heated reaction zone long enough for substantial reaction to take place. Either method is then followed by whatever procedure is desired for removing the aluminum halide.

An excess of aromatic compound over haloalkylsilane should be used in case it is desired to obtain higher yields of a mono(silylalkyl)aromatic compound. In such case it is preferred that the amount of aromatic compound be not less than about two moles per mole of haloalkylsilane and most desirable that the molar ratio of aromatic compound to haloalkylsilane be about 3 to 1. When the molar ratio of aromatic compound to haloalkylsilane is much larger than 3 to 1, the reaction may need to be conducted at increased pressure. Since the excess aromatic compound must be distilled from the reaction mixture before distillation to obtain the reaction product, from the standpoint of economy of time it is desirable that the molar ratio of aromatic compound to haloalkylsilane be not greater than about 7 to 1.

When it is desired to obtain higher yields of a bis or tris(silylalkyl) aromatic compound the amount of haloalkylsilane should be not less than about 1 mole per mole of aromatic compound and it is preferred that it be not less than about 1.5 moles per mole of aromatic compound. It is preferred that the molar ratio of haloalkylsilane to aromatic compound be not more than about 2.5 to 1, and most desirable that it be not more than about 2 to 1. A bis or tris(silylalkyl) aromatic compound may be obtained by reacting a mono(silylalkyl) aromatic compound with an additional amount of the haloalkylsilane used in the preparation of the mono(silylalkyl)-aromatic compound.

The following procedures illustrate the method of the invention by which increased yields of organosilicon compounds are obtained.

Example 1

A haloalkylsilane (66½ grams of beta-chloroethyltrichlorosilane) and an aromatic hydrocarbon (78 grams of benzene) are mixed in a 300 ml. three-necked flask equipped with a mercury sealed stirrer and a reflux condenser fitted with a calcium chloride tube. Aluminum chloride (0.55 gram) is added to the stirred mixture in small portions. The mixture is heated gently for about twenty minutes. The heating is then discontinued for twenty minutes during which time HCl is evolved vigorously. The mixture is again heated for 35 minutes before distilling under reduced pressure to yield crude beta-phenylethyltrichlorosilane (52 grams), B. P. 164–174 degrees C. at 80 mm. Hg (i. e. boiling within the range 164 to 174 degrees C. at an absolute pressure of 80 mm. Hg). This product is redistilled under reduced pressure to yield colorless beta-phenylethyltrichlorosilane, B. P. 107–108 degrees C. at 2 mm. Hg.

The procedure described in the preceding paragraph is repeated except that the amount of aluminum chloride is increased to .87 gram. Distillation of the reaction mixture yields beta-phenylethyltrichlorosilane which is contaminated with aluminum chloride. The aluminum chloride is then removed by adding to the hot reaction product phosphorus oxychloride (about 1.02 grams). The mixture is cooled and an equal volume of a hydrocarbon solvent (about 65 ml. of "Sohio S. R. Solvent," a petroleum fraction composed mainly of aliphatic hydrocarbon material boiling within the range 100 to 286 degrees F.) is added to precipitate the $AlCl_3.POCl_3$ complex. The mixture is allowed to stand for approximately 16 hours and is then filtered. The filtrate is placed in a one liter Claisen flask and distilled to yield colorless beta-phenylethyltrichlorosilane (57.5 grams), B. P. 107–108 degrees C. at 2 mm. Hg.

The procedure described in the preceding paragraph is repeated, except that the amount of aluminum chloride is increased to 1.32 grams and the amount of phosphorus oxychloride used to form a complex with the aluminum chloride is 1.53 grams. The final distillation yields colorless beta-phenylethyltrichlorosilane (76 grams), B. P. 107–108 degrees C. at 2 mm. Hg.

An aralkylsilane (397 grams of beta-phenylethyltrichlorosilane prepared by several runs in accordance with one or more of the procedures described in the preceding paragraphs) is mixed with a haloalkylsilane (109 grams of beta-chloroethyltrichlorosilane) in a 1 liter three-necked flask equipped with a mercury sealed stirrer and a reflux condenser fitted with a calcium chloride tube. The mixture is gently heated and stirred while an aluminum halide (1.47 grams of aluminum chloride) is added in small portions over a period of one hour. After the addition of aluminum chloride is completed, the mixture is refluxed for five hours. The mixture is then cooled to about 95 degrees C., and phosphorus oxychloride (1.4 cc.) is added to complex the aluminum chloride. After further cooling, a hydrocarbon solvent (500 cc. of "Sohio S. R. Solvent") is added to precipitate the $AlCl_3.POCl_3$ complex. The mixture is allowed to stand overnight and is then filtered. The filtrate is placed in a 1 liter Claisen flask and the excess hydrocarbon solvent is distilled at atmospheric pressure before distilling at reduced pressure to obtain a fraction (57 grams), B. P. 65 degrees C. at 20 mm. Hg to 117 degrees C. at 14 mm. Hg and another fraction (273 grams, B. P. 117 degrees C. at 14 mm. Hg to 168 degrees C. at 1 mm. Hg. This latter fraction is redistilled to recover unreacted beta-phenylethyltrichlorosilane (124 grams). The residue from this redistillation is combined with 138 grams of residue from the first fractionation, and the mixture is distilled to yield a bis(2-trichlorosilylethyl)benzene (134 grams), B. P. 155–159 degrees C. at 1 mm. Hg.

A haloalkylsilane (449 grams of beta-chloroethyltrichlorosilane) is mixed with an aromatic compound (106 grams of benzene) and an aluminum halide (6.05 grams of aluminum chloride) is added, using the apparatus and procedure described in the preceding paragraph. After the addition of aluminum chloride is completed, the mixture is refluxed for one hour. The mixture is then cooled to about 95 degrees C. and phosphorus oxychloride (5 cc.) is added to complex the aluminum chloride. After further cooling, a hydrocarbon solvent (500 cc. of "Sohio S. R. Solvent") is added to precipitate the $AlCl_3.POCl_3$ complex. The mixture is allowed to stand overnight and is then filtered. The filtrate is placed in a 1 liter Claisen flask and the excess hydrocarbon solvent is distilled at atmospheric pressure. The residue is then distilled at reduced pressure to recover all the material boiling at temperatures up to 220 degrees C. at 1 mm. Hg. This material is distilled to yield a fraction (134 grams), B. P. 154–174 degrees C. at 1 mm. Hg. This fraction is redistilled to yield a bis(2-trichlorosilylethyl)benzene, B. P. 155–165 degrees C. at 1 mm. Hg.

The distillation residue obtained from various runs carried out as described in the preceding paragraphs (493 grams of the combined residues) is mixed with an aromatic compound (384 grams of benzene) in a 1 liter three-necked flask equipped with a mercury sealed stirrer and a reflux condenser fitted with a calcium chloride tube. The mixture is heated gently while aluminum chloride is added over a one-half hour period in three 1.64 gram portions. The mixture is then refluxed for eight hours. After cooling to about 95 degrees C., phosphorus oxychloride (3.9 cc.) is added, and the mixture is allowed to stand for 24 hours. The excess benzene is then distilled at atmospheric pressure, and the $POCl_3.AlCl_3$ complex is filtered from the reaction mixture. The filtrate is distilled under reduced pressure and a fraction (253 grams) of material boiling at temperatures up to 188 degrees C. at 2 mm. Hg is recovered. This fraction is redistilled to yield beta-phenylethyltrichlorosilane (60 grams), B. P. 100 degrees C. at 1 mm. Hg, a material (55 grams) B. P. 100–151 degrees C. at 1 mm. Hg, and a bis(2-trichlorosilylethyl)benzene (92 grams), B. P. 151–159 degrees C. at 1 mm. Hg.

*Example 2*

The distillation residue obtained from a reaction carried out as described in the first paragraph of Example 1 is refluxed with an excess of benzene for about one hour. The mixture is then distilled under reduced pressure to obtain an additional yield of beta-phenylethyltrichlorosilane.

*Example 3*

(a) An alkyltrihalosilane is chlorinated by means of a reaction with molecular chlorine according to the following procedure: An alkyltrihalosilane (357 grams of cyclohexyltrichlorosilane) is placed in a glass tube approximately three feet in length, having an internal diameter of about 50 mm., packed at the bottom with Raschig rings (to a height of about 5 cm.) and fitted with a gas inlet tube (having an internal diameter of about 6 mm.) which is sealed through the bottom of the tube so that the chlorine is discharged from a vertical section of this tube (near the bottom of the reactor) into the alkyltrihalosilane. The top of the reactor tube is fitted with a Dry Ice condenser and a glass tube which conducts any gases not condensed in the Dry Ice condenser to a water scrubber where HCl formed by the chlorination is removed. The amount of HCl absorbed in the water scrubber is determined by titration with sodium hydroxide. Into the silane (which is at a temperature of about 25 degrees C.) is introduced chlorine (at a temperature of about 25 degrees C.) for about 100 minutes at such a rate that about 1.67 mols of hydrogen chloride are collected in the water scrubber during the 100 minutes. The liquid remaining in the reactor is separated by fractional distillation to yield cyclohexyltrichlorosilane (112 grams) and a mixture of chlorocyclohexyltrichlorosilanes (174 grams) boiling in the range between 108 degrees C. and 111 degrees C. at an absolute pressure of 6 mm. of mercury. By a similar procedure butyltrichlorosilanes are chlorinated.

A haloalkylsilane (75 grams of beta-chlorobutyltrichlorosilane) and an aromatic hydrocarbon (92 grams of toluene) are placed in a 500 ml. three-necked flask equipped with a mercury sealed stirrer and a reflux condenser fitted with a calcium chloride tube. The mixture is stirred and an aluminum halide (0.5 gram of aluminum chloride) is added to the mixture in small portions over a period of 20 minutes. The reaction is slightly exothermic and is accompanied by copious evolution of HCl. After the entire amount of aluminum chloride has been added, the mixture is stirred and refluxed for 15 minutes to complete the reaction and drive off HCl.

The reaction mixture is then placed in a Claisen flask and heated at about 111 degrees C. at atmospheric pressure to distill toluene (70 grams). The distillation is then continued under reduced pressure to obtain a crude beta-tolylbutyltrichlorosilane (58 grams), B. P. 173–176 degrees C. at 36 mm. Hg. This crude product is then redistilled under reduced pressure to give a water white beta-tolylbutyltrichlorosilane, B. P. 122–123 degrees C. at 1.5 mm. Hg. When the residue remaining from these distillations is treated with toluene and aluminum chloride as described in the last paragraph of Example 1, a substantial additional yield of the beta-tolylbutyltrichlorosilane is obtained.

(b) An aromatic hydrocarbon (138 grams of toluene) is reacted with a haloalkylsilane (106 grams of beta-chloropropyltrichlorosilane) by the procedure given in (a) except that the aluminum chloride (0.5 gram) is added in small quantities over a period of 45 minutes. Distillation under reduced pressure yields a crude beta-tolylpropyltrichlorosilane (60 grams), B. P. 173–176 degrees C. at 52 mm. Hg. Redistillation under reduced pressure yields a water white beta-tolylpropyltrichlorosilane, B. P. 124–125 degrees C. at 3 mm. Hg. Upon treating the residue remaining from these distillations with toluene and aluminum chloride as described in the last paragraph of Example 1, a substantial additional yield of the beta-tolylpropyltrichlorosilane is obtained.

(c) An aromatic hydrocarbon (78 grams of benzene) is reacted with a haloalkylsilane (71 grams of beta-chloropropyltrichlorosilane) by the procedure given in (a) except that the aluminum chloride (0.5 gram) is added in small quantities over a period of 25 minutes, and after addition of the aluminum chloride is completed, the mixture is refluxed for 20 minutes. Distillation under reduced pressure yields beta-phenylpropyltrichlorosilane (60 grams), B. P. 165–168 degrees C. at 70 mm. Hg. Redistillation under reduced pressure yields water white beta-phenylpropyltrichlorosilane, B. P. 110–111 degrees C. at 2 mm. Hg. When the residue remaining from these distillations is treated with benzene and aluminum chloride as described in the last paragraph of Example 1, a substantial additional yield of beta-phenylpropyltrichlorosilane is obtained.

(d) An aromatic hydrocarbon (92 grams of toluene) is reacted with a haloalkylsilane (63.8 grams of beta-chloroethylethyldichlorosilane) by the procedure given in (a) except that the mixture is heated while the aluminum chloride (0.53 gram) is added in small portions over a period of 20 minutes and after the addition of $AlCl_3$ is completed, the mixture is refluxed for two hours. Distillation under reduced pressure yields a beta-tolylethylethyldichlorosilane, B. P. 124–125 degrees C. at 1 mm. Hg. When the residue remaining from this distillation is treated with toluene and aluminum chloride as described in the last paragraph of Example 1, a substantial additional yield of the beta-tolylethylethyldichlorosilane is obtained.

(e) An aromatic hydrocarbon (113 grams of chlorobenzene) is reacted with a haloalkylsilane (66½ grams of beta-chloroethyltrichlorosilane) by the procedure given in (a) except that after addition of the aluminum chloride (0.53 gram) the mixture is refluxed for one hour. Distillation under reduced pressure yields a beta- (chlorophenyl)ethyltrichlorosilane (48 grams), B. P. 156–166 degrees C. at 23 mm. Hg. Redistillation gives a colorless product, B. P. 118–119 degrees C. at 1 mm. Hg. When the residue remaining from these distillations is treated with chlorobenzene and aluminum chloride as described in the last paragraph of Example 1, a substantial additional yield of the beta-(chlorophenyl)ethyltrichlorosilane is obtained.

(f) A haloalkylsilane (105 grams of alpha-chloroethyltrichlorosilane) and an aromatic hydrocarbon (138 grams of toluene) are reacted by the procedure given in (a) except that after the addition of the aluminum chloride (0.8 gram) the mixture is refluxed for one hour. Distillation of the reaction mixture from a Claisen flask under reduced pressure yields an alpha-tolylethyltrichlorosilane (35 grams), B. P. 174–178 degrees C. at 70 mm. Hg. Redistillation of this product under reduced pressure yields a colorless alpha-tolylethyltrichlorosilane, B. P. 109–110 degrees C. at 2 mm. Hg. When the residue remaining from these distillations is treated with toluene and aluminum chloride as described in the last paragraph of Example 1, a substantial additional yield of the alpha-tolylethyltrichlorosilane is obtained.

(g) A haloalkylsilane (99 grams of a mixture of alpha- and beta-chloroethyltrichlorosilanes) and an aromatic hydrocarbon (182 grams of trichlorobenzene) are placed in a 500 ml. three-necked flask equipped with a mercury sealed stirrer and a reflux condenser fitted with a calcium chloride tube. Aluminum chloride (0.35 gram, i. e., one-half the total charge of 0.7 gram to be added) is added and the mixture stirred and refluxed for three quarters of an hour (the reaction begins rather sluggishly at a temperature of about 115 degrees C., and HCl is evolved at a moderate rate) after which time the remainder of the aluminum chloride (0.35 gram) is added. The stirring and heating of the mixture are continued (for about an hour and 45 minutes) until the evolution of HCl ceases. The reaction mixture is then placed in a Claisen flask and excess trichlorobenzene is distilled under reduced pressure. Distillation is continued to obtain a mixture of alpha- and beta-(trichlorophenyl)ethyltrichlorosilanes (45 grams), B. P. 166–168 degrees C. at 2 mm. Hg. When the residue remaining from this distillation is treated with trichlorobenzene and aluminum chloride as described in the last paragraph of Example 1, a substantial additional yield of the mixture of alpha- and beta-(trichlorophenyl)ethyltrichlorosilanes is obtained.

(h) A haloalkylsilane (198 grams of beta-chloroethyltrichlorosilane) and an aromatic hydrocarbon (68 grams of chlorobenzene) are placed in a 1 liter three-necked flask equipped with a mercury sealed stirrer and a reflux condenser fitted with a calcium chloride tube. The mixture is gently heated and stirred while an aluminum halide (2.6 grams of aluminum chloride) is added in small portions over a period of forty minutes. The mixture is then refluxed for about three more hours. The mixture is cooled to a temperature of about 95 degrees C. and phosphorus oxychloride (3.2 cc.) is added to complex the aluminum chloride. After further cooling, a hydrocarbon solvent (275 cc. of "Sohio S. R. Solvent") is added to precipitate the AlCl₃·POCl₃ complex. The mixture is allowed to stand overnight and is then filtered. The filtrate is placed in a 1 liter Claisen flask and the excess hydrocarbon solvent is distilled at atmospheric pressure. The residue is then distilled under reduced pressure to yield a bis(2-trichlorosilylethyl)chlorobenzene (49 grams), B. P. 192–195 degrees C. at 1 mm. Hg. When the residue remaining from this distillation is treated with chlorobenzene and aluminum chloride as described in the last paragraph of Example 1, a substantial additional yield of the bis(2-trichlorosilylethyl)chlorobenzene is obtained.

(i) An aromatic hydrocarbon (92 grams of toluene) is reacted with a haloalkylsilane (63.8 grams of alpha-chloroethylethyldichlorosilane) by the procedure given in (d). Distillation under reduced pressure yields an alpha-tolylethylethyldichlorosilane (6 grams), B. P. 139–140 degrees C. at 6 mm. Hg. When the residue remaining from this distillation is treated with toluene and aluminum chloride as described in the last paragraph of Example 1, a substantial additional yield of the alpha-tolylethylethyldichlorosilane is obtained.

(j) A haloalkylsilane (51 grams of beta-chloroisobutyltrichlorosilane) and an aromatic hydrocarbon (62 grams of toluene) are mixed in a 500 ml. three-necked flask equipped with a mercury sealed stirrer and a reflux condenser fitted with a calcium chloride tube. Aluminum chloride (0.36 gram) is added to the stirred mixture in small portions over a period of one hour and fifteen minutes, the mixture being gently heated during the addition of the aluminum chloride. Distillation under reduced pressure yields a crude beta-tolylisobutyltrichlorosilane (27 grams), B. P. 174–178 degrees C. at 17 mm. Hg. This product is redistilled under reduced pressure to yield a colorless beta-tolylisobutyltrichlorosilane, B. P. 123–124 degrees C. at 1 mm. Hg. When the residue remaining from these distillations is treated with toluene and aluminum chloride as described in the last paragraph of Example 1, a substantial additional yield of the beta-tolylisobutyltrichlorosilane is obtained.

(k) A haloalkylsilane (198 grams of alpha-chloroethyltrichlorosilane) and an aromatic hydrocarbon (226 grams of chlorobenzene) are placed in a 2 liter three-necked flask fitted with a stirrer and a reflux condenser. Aluminum chloride (⅔ gram, i. e., about ⅓ of the total amount of 2 grams to be added) is added and the mixture is stirred and heated at gentle reflux for 20 minutes. (Evolution of HCl commences when the liquid approaches the reflux point.) The heating is discontinued and the remainder of the aluminum chloride (1⅓ grams) is added to the reaction mixture. When the vigorous evolution of HCl subsides (after about 10 minutes), heating is again continued and the mixture is stirred and refluxed for about 3 hours. Heat is then removed. Phosphorus oxychloride (3.1 grams is added to the hot mixture to complex the aluminum chloride. The mixture is cooled, and an equal volume of hydrocarbon solvent (425 ml. "Sohio S. R." solvent) is added to precipitate the AlCl₃·POCl₃ complex. The mixture is allowed to stand for approximately 16 hours. The mixture is then filtered and the filtrate is placed in a one liter Claisen flask. The hydrocarbon solvent and unreacted chlorobenzene are then distilled at atmospheric pressure. The residue is distilled under reduced pressure and a fraction (180 grams), B. P. 125–170 degrees C. at 2 mm. Hg is recovered. This fraction is redistilled to yield a water white alpha-(chlorophenyl)ethyltrichlorosilane (158 grams), B. P. 126–128 degrees C. at 2 mm. Hg. When the residue remaining from these distillations is treated with chlorobenzene and aluminum chloride a substantial additional yield of the alpha-(chlorophenyl)ethyltrichlorosilane is obtained.

(l) A haloalkylsilane (233 grams of alpha,-beta-dichloroethyltrichlorosilane) and an aromatic hydrocarbon (565 grams of chlorobenzene) are placed in a two liter three-necked flask equipped with a mercury sealed stirrer and a reflux condenser fitted with a calcium chloride tube. Aluminum chloride (0.66 gram, i. e., about ¼ of the total of 2.66 grams to be added) is added and the mixture is stirred and heated to gentle reflux. The reaction mixture becomes colored and evolution of HCl commences. The refluxing is discontinued after 15 minutes and about half the remainder of the aluminum chloride (1 gram) is then added. The evolution of HCl is so vigorous that some chlorobenzene is lost and the flask is cooled. After the vigorous reaction subsides, the mixture is refluxed for one-half hour. Refluxing is discontinued and the remainder of the aluminum chloride (1 gram) is added. Refluxing is again continued for about 3¼ hours, making the total heating period about 4 hours. Heat is then removed and phosphorus oxychloride (about 3.1 grams) is added to complex the aluminum chloride. When the temperature of the mixture is about 50 degrees C., kieselguhr (25 grams) is added to absorb the AlCl₃.POCl₃ complex. The mixture is allowed to stand until it reaches room temperature. It is then filtered and the filtrate is placed in a 1 liter Claisen flask. The excess chlorobenzene is distilled at atmospheric pressure, and the residue is then distilled under reduced pressure; a fraction (212 grams), B. P. 195–210 degrees C. at 1 mm. Hg is recovered. This fraction is redistilled twice to remove traces of AlCl₃. The final reduced pressure distillation yields a light brown, viscous alpha,beta-di(chlorophenyl)ethyltrichlorosilane with a purple fluorescense, B. P. 194–200 C. at 0.5 to 1 mm. Hg. When the residue remaining from these distillations is treated with chlorobenzene and aluminum chloride as described in the last paragraph of Example 1, a substantial additional yield of the alpha,beta-di(chlorophenyl)ethyltrichlorosilane is obtained.

(m) A haloalkylsilane (405 grams of beta-chloropropyltrichlorosilane) and an aromatic hydrocarbon (850 grams of o-dichlorobenzene) are placed in a two liter three-necked flask equipped with a mercury sealed stirrer and a reflux condenser fitted with a calcium chloride tube. Aluminum chloride (1.2 grams, i. e., about one third of the total amount of 3.7 grams to be added) is added and the mixture is stirred and heated gently for about 45 minutes. (Evolution of HCl commences when the temperature is about 80 degrees C.) The heating is then discontinued and a second portion of AlCl₃ (1.2 grams) is added. The evolution of HCl becomes so vigorous that the flask is cooled. After the reaction subsides, the remainder of the AlCl₃ (1.3 grams) is added and the mixture is stirred and heated sufficiently so that evolution of HCl continues. After two hours the heating is discontinued and POCl₃ (4.5 grams) is added to complex the AlCl₃. When the reaction mixture has cooled, it is poured into a hydrocarbon solvent (1250 ml. of "Sohio S. R. Solvent") and the resulting mixture is allowed to stand for 24 hours at a temperature of 30 degrees F. to precipitate the AlCl₃ complex. The liquid is then decanted from the mixture into a Claisen flask, leaving a dark residue containing the AlCl₃.POCl₃ complex. The hydrocarbon solvent is distilled at atmospheric pressure. The excess o-dichlorobenzene (473 grams) is then distilled under reduced pressure. The residue is then distilled under reduced pressure and a fraction (450 grams), B. P. 138–150 degrees C. at 1 mm. Hg is recovered. This fraction is redistilled at reduced pressure to give an almost colorless beta-(dichlorophenyl)propyltrichlorosilane, B. P. 143–145 degrees C. at 1 mm. Hg. When the residue remaining from these distillations is treated with o-dichlorobenzene and aluminum chloride as described in the last paragraph of Example 1, a substantial additional yield of the beta-(dichlorophenyl)propyltrichlorosilane is obtained.

(n) A haloalkylsilane (66 grams of beta-chloroethyltrichlorosilane) and an aromatic hydrocarbon (147 grams of o-dichlorobenzene) are placed in a 500 ml. three-necked flask equipped with a mercury sealed stirrer, a reflux condenser fitted with a calcium chloride tube, and a thermometer immersed in the liquid. Aluminum chloride (0.35 gram, i. e., about one-half the total amount of 0.69 gram to be added) is added and the mixture is stirred and heated for about 20 minutes. (Evolution of HCl commences when the temperature of the reaction mixture reaches 118 degrees C.) Heating is discontinued while the remainder of the aluminum chloride (0.34 gram) is added and then the mixture is again stirred and refluxed for 1½ hours. The temperature of the liquid does not go over 135 degrees C. Heat is removed and the mixture is cooled to about 95 degrees C. Phosphorus oxychloride (0.76 gram) is added to the mixture which is then placed in a Claisen flask. Unreacted o-dichlorobenzene is distilled under reduced pressure. The distillation is then continued and a fraction (56 grams), B. P. 120–132 degrees C. at 1 mm. Hg is recovered. This product is redistilled under reduced pressure to yield a water white beta-(dichlorophenyl)ethyltrichlorosilane, B. P. 136–138 degrees C. at 2 mm. Hg. When the residue remaining from these distillations is treated with o-dichlorobenzene and aluminum chloride as described in the last paragraph of Example 1, a substantial additional yield of the beta-(dichlorophenyl)ethyltrichlorosilane is obtained.

(o) A haloalkylsilane (106 grams of gamma-chloropropyl-trichlorosilane) and an aromatic hydrocarbon (138 grams of toluene) are mixed in 500 ml. three-necked flask equipped with a mercury sealed stirrer and a reflux condenser fitted with a calcium chloride tube. Aluminum chloride (0.25 gram, i. e., one-half of the total amount of 0.5 gram to be added) is added in small portions to the mixture. Evolution of HCl is very slow. Forty minutes after the aluminum chloride is added, the mixture is heated until the toluene starts to reflux. The rate of evolution of HCl increases when this heating is started. Heating is continued for one hour during which time the remainder of the aluminum chloride (0.25 gram) is added in small portions. The reaction mixture is then placed in a Claisen flask and distilled under reduced pressure to yield a gamma-tolylpropyltrichlorosilane (30 grams), B. P. 178–180 degrees C. at 50 mm. Hg. This product is redistilled under reduced pressure and a water white gamma-tolylpropyltrichlorosilane, B. P. 126–127 degrees at 1.5 mm. Hg. is recovered. When the residue remaining from these distillations is treated with toluene and aluminum chloride as described in the last paragraph of Example 1, a substantial additional yield of the gamma - tolylpropyltrichlorosilane is obtained.

(p) By the procedure described in the preceding paragraph gamma-chlorobutyltrichlorosilane (56 grams) is reacted with toluene (79 grams) in the presence of aluminum chloride (0.4 gram), distillation of the reaction mixture under reduced pressure yielding a gamma-tolybutyltrichlorosilane (12 grams), B. P. 188–195 degrees C. at 52 mm. Hg. Redistillation of this product yields a water white gamma-tolylbutyltrichlorosilane, B. P. 121–122 degrees C. at 1.5 mm. Hg. When the residue remaining from these distillations is treated with toluene and aluminum chloride as described in the last paragraph of Example 1, a substantial additional yield of the gamma-tolylbutyltrichlorosilane is obtained.

(q) A haloalkylsilane (78 grams of a chlorocyclohexyltrichlorosilane) and an aromatic hydrocarbon (86 grams of toluene) are mixed in a 500 ml. three-necked flask equipped with a mercury sealed stirrer and a reflux condenser fitted with a calcium chloride tube. Aluminum chloride (0.45 gram) is added to the stirred mixture in small portions over a period of twenty minutes. Heat is applied during the last ten minutes of the addition to bring the toluene to reflux. The mixture is refluxed for about one hour. The reaction mixture is distilled under reduced pressure to yield a crude tolylcyclohexyltrichlorosilane (65 grams), B. P. 193–196 degrees C. at 14 mm. Hg. This product is redistilled under reduced pressure to yield a water white tolylcyclohexyltrichlorosilane, B. P. 159–160 degrees C. at 2 mm. Hg. When the residue remaining from these distillations is treated with toluene and aluminum chloride as described in the last paragraph of Example 1, a substantial additional yield of the tolylcyclohexyltrichlorosilane is obtained.

(r) A haloalkylsilane (176 grams of a chlorocyclohexyltrichlorosilane) and an aromatic hydrocarbon (156 grams of benzene) are mixed in a one liter three-necked flask equipped with a mercury sealed stirrer and a reflux condenser fitted with a calcium chloride tube. Aluminum chloride (0.59 gram, i. e., about one-third of the total charge of 1.78 grams to be added) is added and the mixture is stirred and heated for a total reaction time of 2 hours, during which time the remainder of the aluminum chloride (1.19 grams) is added in two approximately equal portions, one about twenty and the other about forty minutes after heating is started. Evolution of HCl commences as the benzene nears its boiling point. At the end of the reaction period POCl₃ (2.1 grams) is added to the hot mixture to complex the AlCl₃. Unreacted benzene (72 grams) is then recovered by distilling the reaction mixture to a vapor temperature of 85 degrees C. The reaction mixture is then cooled and cyclohexane (500 ml.) is added. The mixture is allowed to stand for two hours, and then the liquid from the mixture is decanted into a Claisen flask. Cyclohexane is then distilled and the distillation is continued under reduced pressure to yield a fraction (106 grams). That fraction is redistilled under reduced pressure to yield a water white phenylcyclohexyltrichlorosilane, B. P. 151–152 degrees C. at 1 mm. Hg. When the residue remaining from these distillations is treated with benzene and aluminum chloride as described in the last paragraph of Example 1, a substantial additional yield of the phenylcyclohexyltrichlorosilane is obtained.

I claim:
1. A method of producing organosilicon compounds that includes reacting, in the presence of an aluminum halide in which each halogen atom has an atomic weight between 35 and 80, (A) a substance in which there is an aromatic radical having hydrogen atoms attached to at least two adjacent nuclear carbon atoms, in which any atom other than carbon and hydrogen consists of a nuclear halogen having an atomic weight less than 80, and in which not more than one carbon atom is contained in any one monovalent radical attached to an aromatic nucleus, and (B) the distillation residue remaining after the reaction, in the presence of such an aluminum halide, of (a) the aforementioned substance and (b) a substance whose molecule consists of a silicon atom to which are attached four monovalent radicals not more than two of which are unsubstituted saturated hydrocarbon radicals, from one to three of which are halogens having an atomic weight less than 80, and from one to two of which are halo-substituted saturated hydrocarbon radicals in which the substituents consist of halogens having an atomic weight between 35 and 80.

2. A method as claimed in claim 1 in which not more than one of the radicals attached to the silicon atom is an unsubstituted hydrocarbon radical and only one of the radicals attached to the silicon atom is a halo-substituted hydrocarbon radical.

3. A method as claimed in claim 1 in which the last-mentioned substance has the general formula $$wSiCl_3$$

wherein $w$ is a mono-halo-substituted monovalent saturated hydrocarbon radical in which the substituent is a halogen having an atomic weight between 35 and 80.

4. A method as claimed in claim 3 in which the substituent in the mono-halo-substituted hydrocarbon radical is chloro.

5. A method as claimed in claim 4 in which the aluminum halide in both cases is aluminum chloride.

6. A method as claimed in claim 1 in which the last-mentioned substance is a chloroalkyltrichlorosilane having not more than four carbon atoms.

7. A method as claimed in claim 1 in which the last-mentioned substance is a chloropropyltrichlorosilane.

8. A method as claimed in claim 1 in which the last-mentioned substance is a chloroethyltrichlorosilane.

9. A method as claimed in claim 1 in which the last-mentioned substance is a chlorocyclohexyltrichlorosilane.

10. A method as claimed in claim 1 in which the last-mentioned substance is a chlorobutyltrichlorosilane.

DAVID B. HATCHER.

REFERENCES CITED

The following references are of record in the file of this patent:

UNITED STATES PATENTS

| Number | Name | Date |
| --- | --- | --- |
| 2,499,561 | Barry | Mar. 7, 1950 |
| 2,500,652 | Barry | Mar. 14, 1950 |